US008978030B2

(12) United States Patent \
Malaiyandisamy et al.

(10) Patent No.: US 8,978,030 B2 \
(45) Date of Patent: Mar. 10, 2015

(54) ELASTIC PROVISIONING OF RESOURCES VIA DISTRIBUTED VIRTUALIZATION

(75) Inventors: Ganesan Malaiyandisamy, Bangalore (IN); Rajarshi Bhose, Bangalore (IN); Sudeep Mallick, Bangalore (IN)

(73) Assignee: Infosys Limited, Bangalore (IN)

( * ) Notice: Subject to any disclaimer, the term of this patent is extended or adjusted under 35 U.S.C. 154(b) by 312 days.

(21) Appl. No.: 13/112,558

(22) Filed: May 20, 2011

(65) Prior Publication Data

US 2012/0260019 A1   Oct. 11, 2012

(30) Foreign Application Priority Data

Apr. 7, 2011   (IN) .......................... 1188/CHE/2011

(51) Int. Cl.
*G06F 9/455* (2006.01)
*G06F 9/50* (2006.01)
(52) U.S. Cl.
CPC .................................. *G06F 9/5077* (2013.01)
USPC ........................................................... 718/1
(58) Field of Classification Search
None
See application file for complete search history.

(56) References Cited

U.S. PATENT DOCUMENTS

| | | | | |
|---|---|---|---|---|
| 2004/0143664 A1* | 7/2004 | Usa et al. | | 709/226 |
| 2007/0028244 A1* | 2/2007 | Landis et al. | | 718/108 |
| 2009/0276771 A1* | 11/2009 | Nickolov et al. | | 717/177 |
| 2009/0300210 A1* | 12/2009 | Ferris | | 709/235 |
| 2010/0250877 A1* | 9/2010 | Gaither et al. | | 711/162 |
| 2010/0306765 A1* | 12/2010 | DeHaan | | 718/1 |
| 2011/0119604 A1* | 5/2011 | Lo et al. | | 715/762 |
| 2012/0198447 A1* | 8/2012 | Osogami et al. | | 718/1 |

OTHER PUBLICATIONS

Wikipedia, "Ant colony optimization," <en.wikipedia.org/wiki/Ant_colony_optimization>, 14 pages (accessed Mar. 10, 2011). \
Wikipedia, "Distributed operating system," <en.wikipedia.org/Distributed_operating_system>, 17 pages (accessed Mar. 10, 2011).

* cited by examiner

*Primary Examiner* — Emerson Puente \
*Assistant Examiner* — Sisley Kim \
(74) *Attorney, Agent, or Firm* — Klarquist Sparkman, LLP (57) ABSTRACT

A multi-layer architecture is provided for elastic provisioning of virtualized computing resources. The multi-layer architecture comprises a physical hardware layer comprising a plurality of physical computing machines, a distributed operating system layer that aggregates and virtualizes the computing resources, and a virtual machine layer that comprises virtual machines provisioned, by the distributed operating system layer, with virtualized computing resources. Elastic provisioning of virtualized computing resources comprising receiving computing resource information of a plurality of physical computing machines, producing virtualized computing resources by aggregating the received computing resource information of the plurality of physical computing machines, and provisioning the virtualized computing resources among a plurality of virtual machines.

14 Claims, 6 Drawing Sheets

Figure 6

ELASTIC PROVISIONING OF RESOURCES VIA DISTRIBUTED VIRTUALIZATION

BACKGROUND

Existing virtualization technology provides for an abstraction from the underlying hardware resources of a single physical machine. This allows a single physical machine to be partitioned into multiple virtual machines with isolated execution and resource guarantees. However, such virtualization technology does not provide for partitioning multiple virtual machines across multiple physical machines.

Other existing virtualization and cloud computing technologies provide for utilizing resources of multiple machines in a single virtual machine. However, the resources of the single virtual machine, using such technologies, remain tightly bound to the underlying hardware resources of the multiple machines.

In addition, failure of physical machines using existing virtualization and cloud computing technologies is a particular problem. For example, failure of a physical machine can cause a reduction in capability for a virtual machine that utilizes the physical machine. Furthermore, migrating virtual machines across geographically distributed data centers can be difficult when virtual machines are tightly bound to underlying hardware resources and when the large size of live memory of each system has to be transferred over a network over a long distance. Such migration can be time consuming, cause service delays, and negatively impact business operations.

Therefore, there exists ample opportunity for improvement in technologies related to provisioning of resources for virtual machines across multiple physical machines, which can be located in geographically distributed data centers.

SUMMARY

A variety of technologies related to elastic provisioning of virtualized computing resources are applied.

For example, a multi-layer architecture is provided for elastic provisioning of virtualized computing resources. The multi-layer architecture comprises a physical hardware layer comprising a plurality of physical computing machines, a distributed operating system layer that aggregates computing resources of the plurality of physical computing machines of the physical hardware layer to produce virtualized computing resources, and a virtual machine layer that comprises a plurality of virtual machines, where each of the plurality of virtual machines is provisioned virtualized computing resources by the distributed operating system layer from the virtualized computing resources produced by the distributed operating system layer.

As another example, a method is provided for elastic provisioning of virtualized computing resources comprising receiving computing resource information of a plurality of physical computing machines, producing virtualized computing resources by aggregating the received computing resource information of the plurality of physical computing machines, and provisioning the virtualized computing resources among a plurality of virtual machines. In a specific implementation, the method for elastic provisioning of virtualized computing resources is performed by a distributed operating system.

As another example, a computer-readable medium storing computer executable instructions is provided for causing a computing device to perform a method for elastic provisioning of virtualized computing resources, comprising receiving computing resource information of a plurality of physical computing machines, where the computing resource information of the plurality of physical computing machines comprises processing resource information, memory resource information, and storage resource information, producing virtualized computing resources by aggregating the received computing resource information of the plurality of physical computing machines, and provisioning the virtualized computing resources among a plurality of virtual machines.

In some implementations, a scheduling module (e.g., in the distributed operating system layer) is used for receiving instructions from software running on the plurality of virtual machines, and dynamically assigning the received instructions to the plurality of physical computing machines (e.g., which are distributed across multiple data centers).

The foregoing and other features and advantages of the invention will become more apparent from the following detailed description, which proceeds with reference to the accompanying figures.

DETAILED DESCRIPTION OF EXEMPLARY EMBODIMENTS

The following description is directed to techniques and solutions for elastic provisioning of virtualized computing resources. The various techniques and solutions can be used in combination or independently. Different embodiments can implement one or more of the described techniques and solutions.

I. Multi-Layer Architecture

In the technologies described herein, a multi-layer architecture is used for elastic provisioning of virtualized computing resources. The multi-layer architecture comprises different physical and/or logical layers, such as a physical hardware layer, a data center layer, a distributed operating system layer, and/or a virtual machine layer.

In a specific implementation, elastic provisioning of virtualized computing resources is performed in a cloud computing environment. Alternatively, the elastic provisioning of virtualized computing resources can be performed using any environment or technology where virtualization is applied.

Figure 1:
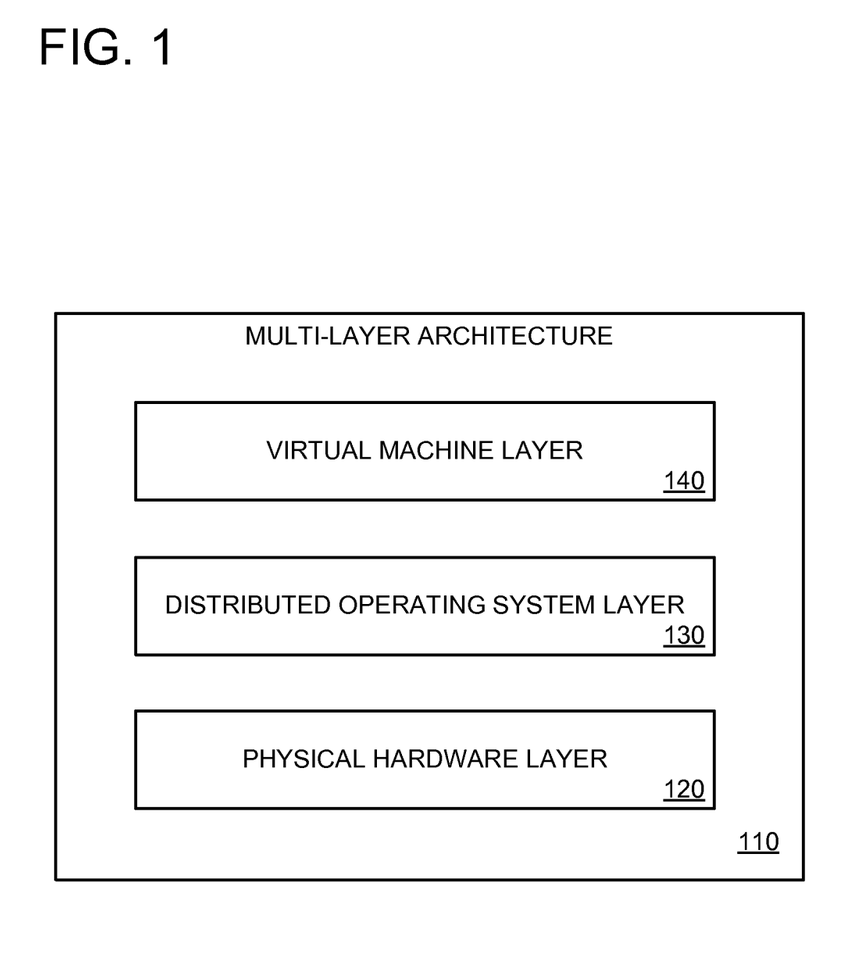
FIG. 1 is a block diagram depicting an example multi-layer architecture for elastic provisioning of virtualized computing resources.

In some implementations, the multi-layer architecture is a three-layer architecture. The three-layer architecture is used for elastic provisioning of virtualized computing resources. FIG. 1 is a block diagram depicting a multi-layer architecture 110 for elastic provisioning of virtualized computing resources. The multi-layer architecture 110 comprises a physical hardware layer 120, a distributed operating system layer 130, and a virtual machine layer 140.

The physical hardware layer 120 comprises a plurality of physical computing machines (e.g., computer servers or other computing devices). The physical computing machines of the physical hardware layer 120 can come from a central location (e.g., a single data center of a business or organization), or from different locations (e.g., from different data centers, which can be geographically distributed). The plurality of physical computing machines supply various computing resources, such as processing resources (e.g., central processing unit (CPU) resources), memory resources (e.g., random access memory (RAM) resources), storage resources (e.g., hard drive storage resources), network resources (e.g., network bandwidth resources), and/or other computing resources.

The distributed operating system layer 130 comprises a distributed operating system for aggregating computing resources of the plurality of physical computing machines of the physical hardware layer 120. The distributed operating system layer 130 aggregates the computing resources to produced virtualized computing resources, which are used for provisioning virtual machines of the virtual machine layer 140.

The virtual machine layer 140 comprises a plurality of virtual machines that that have been provisioned with virtualized computing resources by the distributed operating system layer 130.

For example, in a specific situation, the physical hardware layer 120 could comprise three computer servers, with computing resources as follows:

Computer server 1: 2 GHz CPU, 4 GB RAM, and 2 TB hard drive storage.

Computer server 2: 3 GHZ CPU, 4 GB RAM, and 3 TB hard drive storage.

Computer server 3: 3 GHZ CPU, 8 GB RAM, and 4 TB hard drive storage.

In this situation, the distributed operating system layer 130 would aggregate the computing resources of the three computer servers to produce the following virtualized computing resources: 6 GHZ of total processing capacity, 16 GB of total RAM capacity, and 9 TB of total hard drive storage capacity. The distributed operating system layer 130 would use these virtualized computing resources to provision virtual machines of the virtual machine layer 140. For example, one virtual machine could be provisioned with 1 GHz of CPU capacity, 2 GB of RAM, and 1 TB of hard drive storage, while another virtual machine could be provisioned with 4 GHz of CPU capacity, 10 GB of RAM, and 5 TB of hard drive storage.

The distributed operating system layer 130 supports dynamic re-provisioning and re-adjusting of the virtualized computing resources when computing needs of a virtual machine changes. For example, if a virtual machine requires additional computing resources, the distributed operating system layer 130 can re-provision the virtual machine by adding additional virtualized computing resources.

Because the distributed operating system layer 130 provides an abstraction from the physical computing machines of the physical hardware layer 120, the distributed operating system layer can provide virtualized resources to provision a virtual machine where the virtualized resources are greater than the computing resources of any specific one of the physical computing machines. This allows a virtual machine to dynamically scale up or down in virtualized resources as needed.

In some implementations, the distributed operating system layer 130 comprises a scheduling module that is configured to receive instructions from software (e.g., system software, applications, services, and/or other types of software) running on the virtual machines (at the virtual machine layer 140) and dynamically assign the received instructions to the plurality of physical computing machines at the physical hardware layer 120. For example, the distributed operating system layer 130 can direct CPU instructions from a virtual machine to be executed on processors of one or more physical computing machines according to the provisioning of the virtual machine. The scheduling module can direct instructions to provisioned resources based on properties such as current load (e.g., current CPU utilization of the physical computing machines) and physical location (e.g., by preferring geographically nearer physical computing machines and/or nearer physical computing machines based on network connectivity properties).

Distributed scheduling involves determining where resources are located through the pool of distributed resources to meet the service demands of the requesting virtual machines, and allocating such resources in a transparent manner. In a specific implementation, distributed scheduling is performed, at least in part, using the ant colony optimization algorithm. The distributed scheduler makes repeated use of the ant colony optimization techniques for automated learning, self-correction, and allocating resources to meet the service demands.

II. Distributed Operating System Environment

Figure 2:
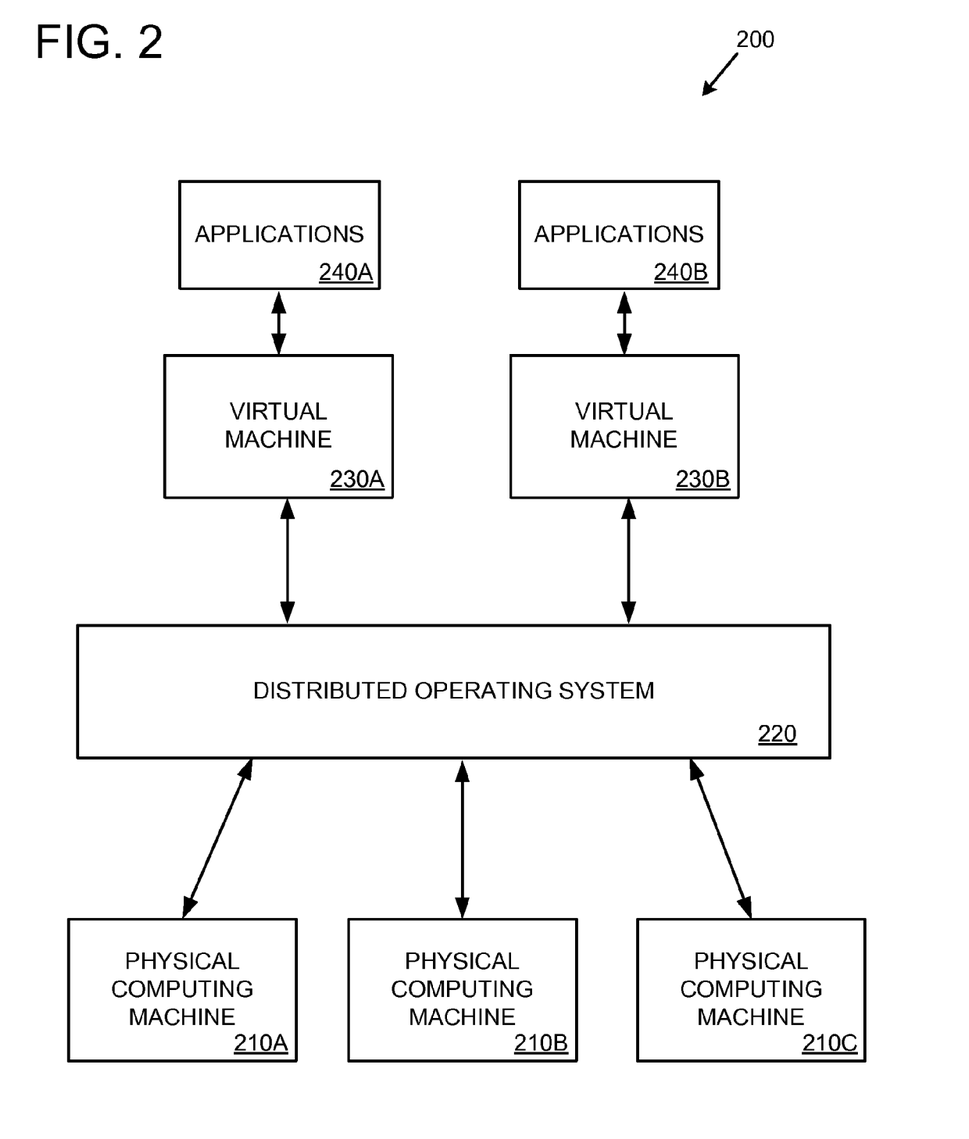
FIG. 2 is a block diagram depicting an example distributed operating system environment for elastic provisioning of virtualized computing resources.

In the techniques and solutions described herein, a distributed operating system environment is provided for elastic provisioning of virtualized computing resources. FIG. 2 is a block diagram depicting an example distributed operating system environment 200 for elastic provisioning of virtualized computing resources.

In the environment 200, a number of physical computing machines (210A-C) provide computing resources. The physical computing machines 210A-C can be part of a physical hardware layer, such as that depicted at 120 in FIG. 1.

In the environment 200, a distributed operating system 220 aggregates the computing resources of the physical computing machines 210A-C to provide virtualized computing resources. The distributed operating system 220 can be part of a distributed operating system layer, such as that depicted at 130 in FIG. 1.

The environment 200 supports provisioning a number of virtual machines, such as 230A and 230B, from the virtualized computing resources. The provisioning is performed by the distributed operating system 220. The virtual machines 230A and 230B provide applications and other computing services 240A and 240B to users. The virtual machines 230A and 230B can be part of a virtual machine layer, such as that depicted at 140 in FIG. 1.

III. Computing Resources from Different Data Centers

Figure 3:
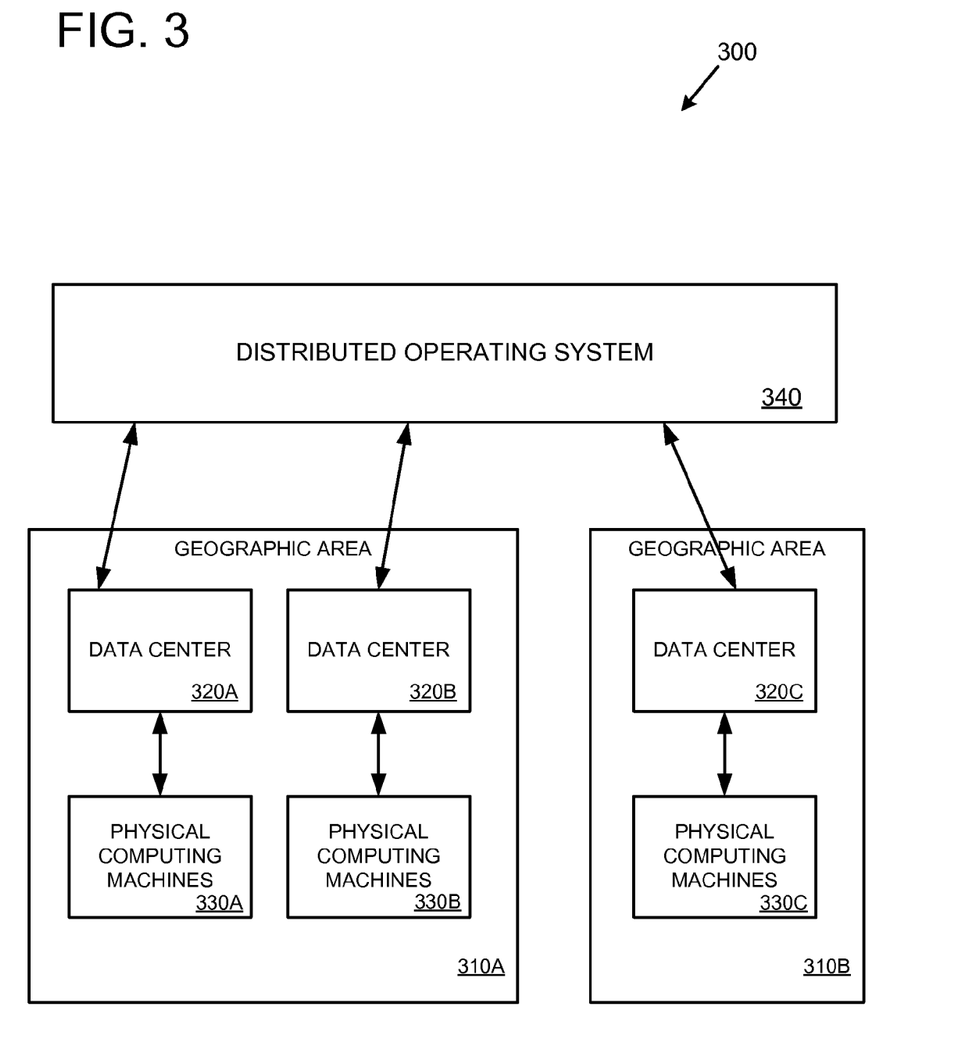
FIG. 3 is a block diagram depicting an example distributed operating system environment for elastic provisioning of virtualized computing resources from different data centers.

In the techniques and solutions described herein, elastic provisioning of virtualized computing resources can be provided from physical machines operating at various data centers. FIG. 3 is a block diagram depicting an example distributed operating system environment 300 for elastic provisioning of virtualized computing resources from different data centers.

The environment 300 includes data centers 320A-C. Two of the data centers (320A and 320B) are located in the same geographic area 310A, and one of the data centers (320C) is located in a different geographic area 310B (e.g., a different city, state, or country). Each data center houses a number of physical computing machines. Data center 320A houses physical computing machines 330A, data center 320B houses physical computing machines 330B, and data center 320C houses physical computing machines 330C.

In the environment 300, a distributed operating system 340 aggregates the computing resources of the physical computing machines 330A-C from the data centers 320A-C to provide virtualized computing resources. Virtualized resources can then be used by the distributed operating system 340 to provision virtual machines. With this arrangement, a virtual machine can utilize virtualized computing resources from a number of physical computing machines from different data centers, and even from different data centers located in different geographic areas. For example, a virtual machine could be provisioned, and utilize, processor resources from a physical machine from 330A and a physical machine from 330C.

IV. Elastic Provisioning of Virtualized Computing Resources

Figure 4:
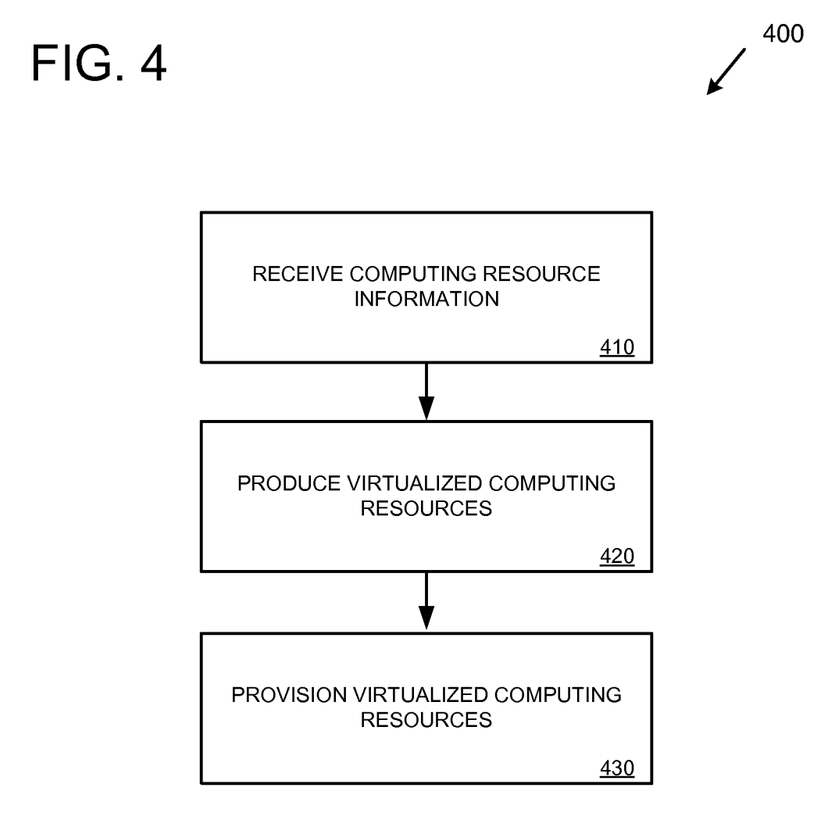
FIG. 4 is a flowchart showing an example method for elastic provisioning of virtualized computing resources.

In the techniques and solutions described herein, methods are provided for elastic provisioning of virtualized computing resources. FIG. 4 depicts an example method 400 for elastic provisioning of virtualized computing resources. For example, the method 400 can be implemented within a distributed operating system (e.g., distributed operating system 220 or 340).

At 410, computing resource information is received for physical computing machines. At 420, the computing resource information is aggregated to produce virtualized computing resources. At 430, virtual machines are provisioned using the virtualized computing resources 420.

In a specific implementation, the receiving 410, producing 420, and provisioning 430 are performed by a distributed operating system. The distributed operating system provides an abstraction of the computing resources of the physical computing machines, and provides a holistic view of the total computing resources obtained by aggregating and virtualizing the physical computing machine resources.

Figure 5:
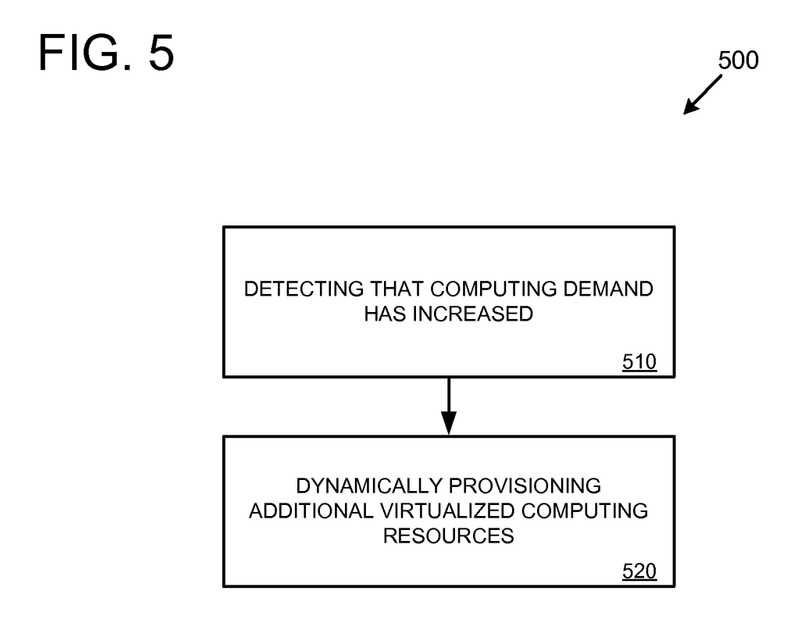
FIG. 5 is a flowchart showing an example method for dynamically provisioning additional virtualized computing resources.

FIG. 5 depicts an example method 500 for dynamically provisioning additional virtualized computing resources. At 510, a computing demand increase is detected for a virtual machine. For example, the increase can be an increase in CPU utilization, memory utilization, storage utilization, and/or network bandwidth utilization. The detected increase can be triggered by the utilization exceeding a threshold value.

At 520, virtualized computing resources are dynamically provisioned in response to the detected increase 510. For example, in response to an increase in CPU utilization, additional CPU virtualized resources can be provisioned to the virtual machine.

In a specific implementation, the detecting 510 and provisioning 520 are performed by a distributed operating system.

In some implementations, the elastic provisioning techniques and tools described herein are used to eliminate the need to migrate virtual machines from one set of physical machines to another (e.g., from one data center to another). Because the elastic provisioning techniques and tools herein use a distributed operating system to provide virtualized resources, virtual machines are not bound to any specific physical machine resources. Therefore, virtualized computing resources can be provided by physical machines in different locations (e.g., different data centers), and virtualized resources can be re-assigned (e.g., dynamically provisioned) when needed, such as when specific physical machine resources become unavailable (e.g., due to a failure) or when demand of a virtual machine increases or decreases. For example, additional virtualized computing resources can be assigned to a virtual machine so that the virtual machine continues to effectively perform its operations (e.g., providing applications and/or services).

In some implementations, dynamic scheduling is used to direct or assign virtual machine computing resource requests to specific physical computing machine resources. In this situation, scheduling is used because the virtualized computing resources are not bound to any specific physical machine. For example, if a specific virtual machine needs to use processor resources, then a scheduler (e.g., a scheduling module of the distributed operating system) can direct the processing instructions to a specific physical machine, or split the processing instructions across different physical machines.

Since the distributed virtualized environment provides an abstraction layer over the underlying distributed hardware formed by the aggregation of a plurality of machines (either locally or remotely, or a mix of local and remote machines), the scheduler has a holistic view of the total available computing resources and is able to assign the computing resources to the virtual machine. It is not necessary for the virtual machine to know the source of its computing resources.

In some implementations, elastic provisioning of computing resources is performed using a cloud computing environment in combination with requisite resources from the available data center resources of an enterprise through the use of virtualization concepts. In this implementation, a distributed virtualization scheme is provided whereby computing resources (e.g., CPU, memory, storage, network) for a virtual machine are provisioned from the multiple physical machines across data centers of an enterprise by providing a combination of layer of distributed operating system over the existing hardware infrastructure layer, and an upper layer of virtualized resources provisioned by the distributed operating system. The end user application receives as much virtual resources provisioned from this virtualization layer as required by the application which is provisioned inside a virtual machine. Due to the provisioning of virtual resources the advantages of virtualization (isolated execution, resource guarantees, such as the high availability of VMs, etc. This technique allows the unbinding of a virtual machine from the single physical machine boundary through a distributed operating system, and provides advantages such as reduction of expensive virtual machine live migration in the event of failure of physical machines, near optimal utilization of geographically distributed multiple data center resources, and better capacity planning due to larger scale aggregation of data center resources.

V. Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources).

Figure 6:
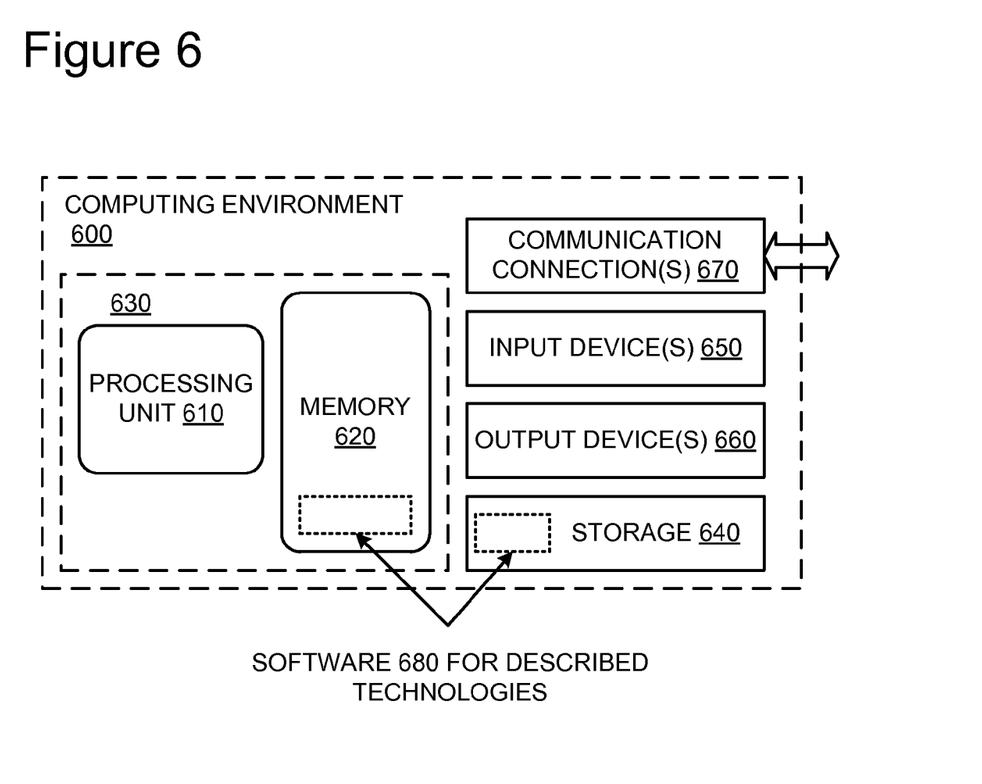
FIG. 6 is a block diagram showing an example computing device.

FIG. 6 illustrates a generalized example of a suitable computing environment 600 in which described embodiments, techniques, and technologies may be implemented. The computing environment 600 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, the computing environment 600 includes at least one central processing unit 610 and memory 620. In FIG. 6, this most basic configuration 630 is included within a dashed line. The central processing unit 610 executes computer-executable instructions. In a multi-processing system, multiple processing units execute computer-executable instructions to increase processing power and as such, multiple processors can be running simultaneously. The memory 620 may be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment may have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other tangible storage medium which can be used to store information and which can be accessed within the computing environment 600. The storage 640 stores instructions for the software 680, which can implement technologies described herein.

The input device(s) 650 may be a touch input device, such as a keyboard, keypad, mouse, pen, or trackball, a voice input device, a scanning device, or another device, that provides input to the computing environment 600. For audio, the input device(s) 650 may be a sound card or similar device that accepts audio input in analog or digital form, or a CD-ROM reader that provides audio samples to the computing environment 600. The output device(s) 660 may be a display, printer, speaker, CD-writer, or another device that provides output from the computing environment 600.

The communication connection(s) 670 enable communication over a communication medium (e.g., a connecting network) to another computing entity. The communication medium conveys information such as computer-executable instructions, compressed graphics information, or other data in a modulated data signal.

VI. Example Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 620 and/or storage 640. As should be readily understood, the term computer-readable media does not include communication connections (e.g., 670) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. We therefore claim as our invention all that comes within the scope and spirit of these claims.

We claim:

1. A multi-layer architecture for elastic provisioning of virtualized computing resources, the multi-layer architecture comprising:
    a physical hardware layer comprising a plurality of physical computing machines;
    a distributed operating system layer, wherein the distributed operating system layer aggregates computing resources of the plurality of physical computing machines of the physical hardware layer to produce virtualized computing resources, wherein the virtualized computing resources are not bound to any particular physical computing machine of the plurality of physical computing machines, and wherein the distributed operating system layer comprises a scheduling module, wherein the scheduling module is configured to:
        receive instructions from software running on the plurality of virtual machines; and
        dynamically assign the received instructions among the plurality of physical computing machines;
    a virtual machine layer, wherein the virtual machine layer comprises a plurality of virtual machines, and wherein each of the plurality of virtual machines is provisioned virtualized computing resources by the distributed operating system layer from the virtualized computing resources produced by the distributed operating system layer; and
    wherein the distributed operating system layer dynamically re-assigns the virtualized computing resources when a computing demand increase exceeds a threshold value for one of the plurality of the virtual machines by eliminating the need to migrate the one of the plurality of the virtual machine from one set of physical computing machines to another, wherein the plurality of physical computing machines are located in a plurality of different data centers, and wherein the plurality of different data centers comprise at least two geographically separate data centers.

2. The multi-layer architecture of claim 1 wherein the computing resources comprise processing resources, memory resources, storage resources, and network resources.

3. The multi-layer architecture of claim 1 wherein the multi-layer architecture is a three-layer architecture.

4. The multi-layer architecture of claim 1 wherein at least one virtual machine of the plurality of virtual machines is provisioned virtualized computing resources from at least two physical computing machines of the plurality of physical computing machines.

5. The multi-layer architecture of claim 1 wherein the scheduling module utilizes, at least in part, an ant colony optimization algorithm.

6. The multi-layer architecture of claim 1 wherein the plurality of virtual machines are dynamically provisioned virtualized computing resources by the distributed operating system layer, and wherein the multi-layer architecture supports re-provisioning virtualized computing resources when one or more physical computing machines of the plurality of physical computing machines fail.

7. The multi-layer architecture of claim 1 wherein the multi-layer architecture supports dynamic provisioning of virtualized computing resources, including provisioning additional virtualized computing resources to a virtual machine of the plurality of virtual machines when computing demand of the virtual machine increases.

8. A method, implemented by a distributed operating system running on one or more computing devices, for elastic provisioning of virtualized computing resources, the method comprising:
    receiving, by the distributed operating system, computing resource information of a plurality of physical computing machines;
    producing, by the distributed operating system, virtualized computing resources by aggregating the received computing resource information of the plurality of physical computing machines, wherein the virtualized computing resources are not bound to any particular physical computing machine of the plurality of physical computing machines;
    provisioning, by the distributed operating system, the virtualized computing resources among a plurality of virtual machines;
    scheduling, by a scheduling module of the distributed operating system, instructions, wherein the scheduling comprises:
        receiving instructions from software running on the plurality of virtual machines; and
        dynamically assigning the received instructions among the plurality of physical computing machines;
    detecting, by the distributed operating system, that computing demand has increased above a threshold value for a virtual machine of the plurality of virtual machines; and
    in response to detecting the increased computing demand above the threshold value, dynamically re-assigning, by the distributed operating system, the virtualized computing resources to the virtual machine which eliminates the need to migrate the virtual machine from one set of physical computing machines to another,
    wherein the plurality of physical computing machines are located in a plurality of different data centers, and wherein the plurality of different data centers comprise at least two geographically separate data centers.

9. The method of claim 8 wherein the computing resource information of the plurality of physical computing machine comprises processing resource information, memory resource information, storage resource information, and network resource information.

10. The method of claim 8 wherein the provisioning comprises provisioning at least one virtual machine of the plurality of virtual machines with virtualized computing resources from at least two physical computing machines of the plurality of physical computing machines.

11. The method of claim 8 wherein the plurality of physical computing machines are located in a plurality of different data centers.

12. A computer-readable medium storing computer executable instructions for causing a computing device to perform a method for elastic provisioning of virtualized computing resources using a distributed operating system, the method comprising:
    receiving computing resource information of a plurality of physical computing machines, wherein the computing resource information of the plurality of physical computing machines comprises processing resource information, memory resource information, storage resource information, and network resource information;
    producing virtualized computing resources by aggregating the received computing resource information of the plurality of physical computing machines, wherein the virtualized computing resources are not bound to any particular physical computing machine of the plurality of physical computing machines;

provisioning the virtualized computing resources among a plurality if virtual machines, and scheduling instructions, wherein the scheduling comprises:

receiving instructions from software running on the plurality of virtual machines; and dynamically assigning the received instructions among the plurality of physical computing machines;

detecting that computing demand has increased above a threshold value for a virtual machine of the plurality of virtual machines; and in response to detecting the increased computing demand above the threshold value, dynamically re-assigning the virtualized computing resources to the virtual machine which eliminates the need to migrate the virtual machine from one set of physical computing machines to another, wherein the plurality of physical computing machines are located in a plurality of different data centers, and wherein the plurality of different data centers comprise at least two geographically separate data centers.

13. The computer-readable medium of claim 12 wherein the provisioning comprises provisioning at least one virtual machine of the plurality of virtual machines with virtualized computing resources from at least two physical computing machines of the plurality of physical computing machines.

14. The computer-readable medium of claim 12 wherein the plurality of physical computing machines are located in a plurality of different data centers.

* * * * *